Figure 1:
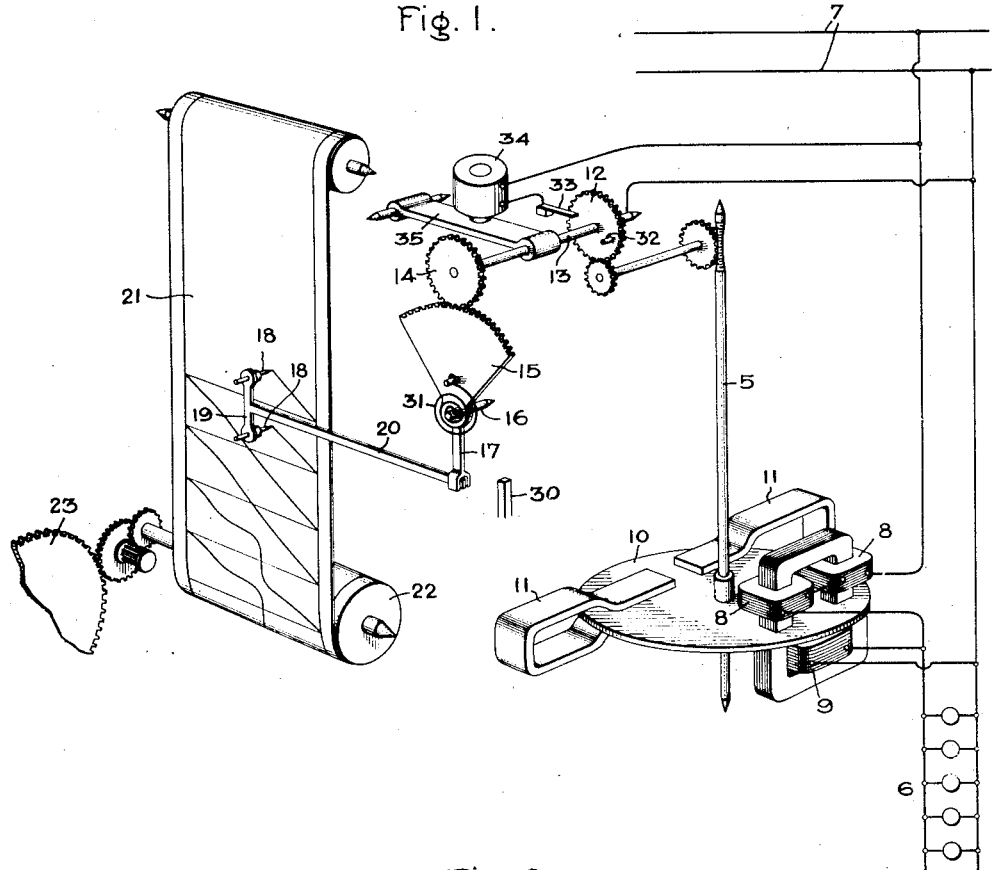

J. R. CRAIGHEAD.
DEMAND MEASUREMENT.
APPLICATION FILED SEPT. 2, 1916.

1,269,525.

Patented June 11, 1918.

Inventor:
James R. Craighead,
by Albert G. Davis
His Attorney.

UNITED STATES PATENT OFFICE.

JAMES R. CRAIGHEAD, OF SCHENECTADY, NEW YORK, ASSIGNOR TO GENERAL ELECTRIC COMPANY, A CORPORATION OF NEW YORK.

DEMAND MEASUREMENT.

1,269,525.        Specification of Letters Patent.        Patented June 11, 1918.

Application filed September 2, 1916. Serial No. 118,256.

*To all whom it may concern:*

Be it known that I, JAMES R. CRAIGHEAD, a citizen of the United States, residing at Schenectady, in the county of Schenectady, State of New York, have invented certain new and useful Improvements in Demand Measurements, of which the following is a specification.

My invention relates to demand measurements, and particularly to the measurement of electric demands. More specifically the invention relates to demand apparatus for indicating or recording the demand made by an electrical installation upon a source of electric energy supply.

One of the objects of my present invention is to provide an improved method of determining the demand of an electrical installation. Another object of the invention is to provide an improved demand apparatus particularly adapted to carry out the method of the invention. A further object of the invention is to provide an improved recording apparatus from whose record is readily ascertainable the demand of an electrical installation during a predetermined period of time beginning at any desired actual time. Other objects of the invention will be brought out in the course of the following discussion.

A well known type of electric demand apparatus measures the demand during each of a plurality of equal time intervals, and records the demand for each time interval or indicates in some suitable manner the maximum demand during any one of a number of such time intervals. In using such apparatus, the highest actual demand is frequently divided between two successive time intervals, and hence the measured demand for either interval is lower than the actual maximum demand. In other words, where the beginning of the predetermined time interval of demand measurement is arbitrarily fixed, a peak demand may easily be divided between two time intervals, instead of being included in a single time interval, as it should be in order to give the true maximum demand for the predetermined length of time.

The improved method of demand measurement of my present invention consists broadly in the production of two similar records whose coördinates are energy consumption and time, and in the arrangement of these records so that the coördinate of any point of one record with respect to the amount of energy consumed is the same as that of the corresponding point of the other record, and so that the coördinate of any point of the first record with respect to time is displaced an amount corresponding to the predetermined time interval of measurement from the time coördinate of the corresponding point of the second record. In other words, the two records are so arranged that the coördinates with respect to the amount of energy consumption of corresponding points on the two records are the same, while coördinates with respect to time of corresponding points on the two records are displaced an amount corresponding to the time interval of demand measurement. Then, for any particular time, the demand during the predetermined time interval is determined by comparing the coördinates with respect to the amount of energy consumption of two points on the two records having the same coördinate of time. The improved demand apparatus of my present invention is particularly adapted to carry out this method, and, accordingly, produces a composite record from which the demand during a predetermined length of time beginning at any desired actual time can be easily ascertained. By the improved method and apparatus of my present invention, the true maximum demand for the predetermined time interval of demand measurement is easily obtained, where it might frequently fail to be properly recorded in present day types of apparatus in which the demands for successive periods of time are arbitrarily recorded.

The preferred construction of demand apparatus of my present invention in its complete form comprises a device adapted to produce on a time actuated record sheet two similar records of the amount of energy consumed or metered. These two similar records are displaced from one another in the direction of movement of the record sheet, that is in the direction of the coördinates of time, by an amount equal to the amount of movement of the record sheet in the particular time interval over which it is desired to know the average demand. The difference between the coördinates with respect to the amount of energy consumed of two points, one on each record, having a common coördinate of time is then a measure of the demand during the predetermined period of time beginning at the time represented by such common coördinate of time.

Figure 2:
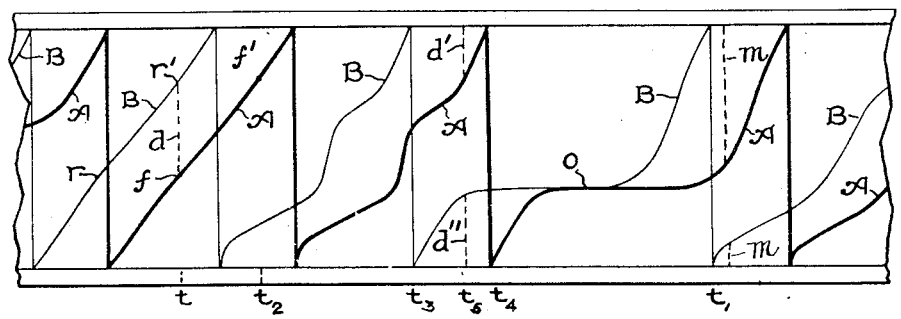

The novel features of the invention which I believe to be patentable are definitely indicated in the claims appended hereto. The invention itself and the construction and mode of operation of demand apparatus embodying the same will be better understood from the following description taken in conjunction with the accompanying drawing, in which:

Figure 1 is a diagrammatic view in perspective of a demand apparatus embodying my present invention; and Fig. 2 is a portion of a record obtained from the apparatus of Fig. 1.

The demand apparatus illustrated in Fig. 1 comprises an integrating electric watthour meter having a rotatable shaft 5. The watt-hour meter is electrically connected to measure the amount of electric energy supplied to translating devices 6 by a source of alternating current 7. The watt-hour meter is of the well known induction meter type having series coils 8 and a potential coil 9 adapted to produce a shifting magnetic field within whose influence is arranged a disk armature 10, of aluminum or other suitable material secured to the meter shaft 5. Permanent magnets 11 damp the rotation of the disk armature 10 in a well understood manner.

The meter shaft 5 is operatively connected, as for example by suitable gearing, to a gear 12 secured to a shaft 13. A gear 14 is also secured to the shaft 13 and is arranged to normally mesh with a sector-shaped gear 15. The sector-shaped gear 15 is rotatably mounted on a pivoted shaft 16 and carries a depending arm 17. Two recording devices 18 are secured to the cross arm 19 of a T-shaped member 20. The standard of the T-shaped member 20 is pivotally attached to the arm 17.

The recording devices 18 may be of any suitable kind for making a graphic record on a time actuated record sheet as chart 21. Thus the recording devices 18 may be pencils, or self-inking pens, or may be metal styli, coöperating with suitably prepared paper. The record sheet 21 may be moved at a uniform speed in any suitable manner. In the drawings, I have shown, for the purposes of explanation, the record sheet 21 wound on a drum 22 rotated at a uniform speed by a clock-driven member 23.

The recording devices or markers 18 are spaced from each other in the direction of movement of the record sheet 21. These two recording devices thus produce two similar records. In fact the two records produced by the recording devices 18 are identical, except that one is displaced from the other a predetermined distance in the direction of movement of the record sheet. The distance, in the direction of movement of the record sheet, between the two recording devices 18 is determined by the time interval for which it is desired to know the demand. Thus, the recording devices 18 are separated by a distance equal to the amount of movement of the record sheet 21 in the predetermined time chosen as the time interval of measurement of the demand. Thus, where the time interval of demand measurement is thirty minutes, the distance between the recording devices 18 is the distance which the record sheet 21 moves in thirty minutes. It will of course be understood that more than two recording devices may be operatively mounted on the cross arm 19, so that a plurality of pairs of records each having different time intervals may be obtained. Preferably, the records produced by the two recording devices 18 are characteristically different, so that the records may be distinguished from one another. Thus, different colored inks may be employed to prevent confusion of the two records.

Whenever electric energy is consumed in the translating devices 6, the meter shaft 5 rotates at a speed which is a measure of the rate of energy consumption, and the total revolutions of the meter shaft are a measure of the integrated energy consumption, as is well understood in the art. The recording devices 18 are moved transversely of the record sheet 21 at a rate proportional to the rate of rotation of the meter shaft, and hence the transverse movement of the recording devices from their initial positions at one side of the record sheet is a measure of the amount of energy consumed in the translating devices since the recording devices occupied their initial positions. The two records thus give an indication of the total watthours of electrical energy consumed in the devices 6 up to any point of time, but one record is displaced on the record sheet by a distance corresponding to the time for which it is desired to indicate the demand.

The actual demand for the desired time interval at any particular time is represented by the transverse distance between the two records. In Fig. 2 of the drawings, I have designated the record produced by the forward recording device by the heavy line A, while the record produced by the rear recording device is designated by the light line B. The demand at any time for the time interval of measurement is then represented by the vertical distance, as viewed in Fig. 2, between the record lines A and B. The greatest transverse distance between the record lines A and B obviously represents the maximum demand. Thus, at the time represented by $t$ on the record sheet, the demand for the predetermined time interval of measurement is represented by the length of the dotted line $d$.

The principle of operation of my improved demand apparatus will perhaps be somewhat better understood by considering at greater length just what each of the two records A and B represents. Take, for example, the position of the recording devices 18 at the time $t$. The forward recording device is at the position designated $f$ on the record sheet while the rear recording device is at the position designated $r$. At time $t_2$ the forward recording device is at position $f'$ while the rear recording device is at position $r'$. The difference between times $t$ and $t_2$ is the predetermined time interval of demand measurement, say, for example, thirty minutes. Then, the amount of energy consumed in the thirty minutes beginning at $t$ is the difference in distance of the points $f$ and $f'$ from the zero or initial line of the record sheet, and obviously this difference in distance is the length of the line $d$. So the length of the line $d$ represents the amount of energy consumed in the translating devices 6 during the time interval beginning at $t$ and ending at $t_2$, or in the case assumed, during a time interval of thirty minutes beginning at time $t$. Similarly, any vertical distance between the records A and B represents the amount of energy consumed, that is the demand in terms of integrated energy, in the predetermined time interval of measurement beginning at the time corresponding to the position of the vertical distance on the record sheet.

As previously pointed out, the maximum integrated demand during the characteristic period of measurement of the device is found by determining the greatest transverse or vertical distance between the two record lines A and B. An inspection of the entire record as a whole will generally indicate about the location of the maximum demand. For example, when the integrated demand over the device's characteristic time interval of measurement is zero, the two records A and B become coincident, as indicated at $o$ on the record shown in Fig. 2 of the drawings. When the integrated demand is relatively low the slope of the two records is very gradual, and as the demand increases the slope of the records increases. This affords a quick and convenient means for picking out the points of relatively large demand, and the maximum demand can be determined by measurement and comparison of such points. In the record of Fig. 2, the maximum demand occurred during the time interval beginning about at $t_1$, and the magnitude of the integrated demand over the device's characteristic time interval is represented by the sum of the two dotted lines $m$, as will be clearly understood from the foregoing description. A scale preferably graduated to units of demand may be moved longitudinally of the record sheet as a convenient means for determining the maximum transverse distance between the two records A and B and hence the maximum demand.

The two records A and B produced by the recording device 18 are in effect continuous records, but the width of the record sheet becomes a limiting factor with respect to the continuous character of these records. Thus, in order to utilize the record sheet to the best advantage, and thus to do away with the necessity of too wide a record sheet, I preferably provide the apparatus with means for intermittently returning the recording devices to an initial or zero position at one side of the record sheet. Thus, when the recording devices have traveled substantially the entire distance transversely of the record sheet, I return the devices to their initial positions. In the apparatus shown in Fig. 1, this is done by interrupting the operative connection between the meter shaft and the sector-shaped gear 15, when the meter shaft has made a predetermined number of revolutions, and then returning the sector-shaped gear 15 and coöperating parts to their respective initial positions, as determined by a fixed stop 30, by means of a spring 31. Thus, the spring 31 normally tends to move the recording devices 18 until the arm 17 engages the fixed stop 30, whereby the initial or zero positions of the recording devices are determined. A movable contact 32 secured to the gear 12 coöperates with a fixed contact 33 each time the meter shaft has made a predetermined number of revolutions to momentarily close the circuit of an alternating current relay 34. When the relay 34 is energized by the engagement of contacts 32 and 33, its armature 35 is attracted, thereby raising the end of the shaft 13 carrying the gear 14 to such an extent that the gear 14 is operatively disconnected from the sector-shaped gear 15. The spring 31 then returns the recording devices 18 to their initial positions. It will be evident that the demand at any time during the interval represented on the record sheet between the lines made by the return of the recording devices to their initial positions, for example during the time interval $t_3$—$t_4$, is the sum of the distances of the two records B and A from the initial and terminal lines, respectively, at the sides of the record sheet. Thus, the demand for the time interval of measurement beginning at time $t_5$ is represented by the sum of the lengths of the two lines $d'$ and $d''$.

The demand apparatus which I have particularly described is especially designed to carry out the method of demand measurement of my present invention, and I now consider this apparatus to be the best means for practising the method. It will of course be understood, however, that the method may be practised in other ways than mentioned in this specification. Since the two records are identical, it is possible to make a single record by the recording apparatus, and then to reproduce this record displaced the proper amount on the record sheet in any suitable manner. Numerous other similar modifications of the invention will occur to those skilled in the art. I, accordingly, do not wish to be restricted to the particular embodiment of the invention herein described and illustrated for explanatory purposes, but I aim in the appended claims to cover all modifications within the scope of the invention.

What I claim as new and desire to secure by Letters Patent of the United States, is:

1. A demand apparatus comprising an integrating electric meter having a rotatable shaft, a time actuated record sheet, a plurality of recording devices in contact with said record sheet and displaced from one another in the direction of movement of the record sheet, means for moving said recording devices transversely of said record sheet at a rate proportional to the rate of rotation of said meter shaft, and means for intermittently returning said recording devices to their initial positions at one side of said record sheet.

2. A demand apparatus comprising an integrating electric meter having a rotatable shaft, a time actuated record sheet, two recording devices adapted to make marks on said record sheet, said recording devices being displaced from one another in the direction of movement of said record sheet, means operatively connecting said recording devices to said meter shaft, and means for intermittently returning said recording devices to their initial positions at one side of said sheet.

3. A demand apparatus comprising an integrating electric meter having a rotatable shaft, a time actuated record sheet, two recording devices in contact with said record sheet and displaced from one another in the direction of movement of the record sheet, means operatively connecting said recording devices to said meter shaft, means normally tending to return said recording devices to their initial positions at one side of said record sheet, and means for periodically interrupting the operative connection between said recording devices and said meter shaft whereby said last mentioned means operates to return said recording devices to their initial positions.

4. A demand apparatus comprising an integrating electric meter having a rotatable shaft, a time actuated record sheet, and means operatively connected to said meter shaft for making two continuous records on said record sheet, said records being displaced from one another in the direction of movement of said record sheet a distance equal to the amount of movement of said record sheet in a predetermined time interval.

5. A demand apparatus comprising an integrating electric meter having a rotatable shaft, a time actuated record sheet, a plurality of recording devices in contact with said record sheet and displaced from one another in the direction of movement of the record sheet, and means operatively connecting said recording devices to said meter shaft.

6. A demand apparatus comprising an integrating electric meter, a time actuated record sheet, a plurality of recording devices, means coöperating with said meter for simultaneously moving said recording devices transversely of said record sheet an amount proportional to the amount of metered energy, said recording devices being displaced from one another a distance equal to the amount of movement of said record sheet in a predetermined time interval, and means for intermittently returning said recording devices to their initial positions at one side of said record sheet.

7. A demand apparatus comprising an integrating electric meter, a time actuated record sheet, and means coöperating with said meter for producing on said record sheet two graphic records of the amounts of metered energy, said two records being identical except that every point of one record is displaced from the corresponding point of the other record a predetermined distance in the direction of travel of the record sheet.

8. A demand apparatus comprising an integrating electric meter having a rotatable shaft, a time actuated record sheet, a recording device adapted to produce two similar records on said record sheet, corresponding points of said two records being displaced from one another a predetermined distance in the direction of movement of said record sheet, and means operatively connecting said recording device to said meter shaft.

9. A demand apparatus for determining the demand of an electrical installation during a predetermined period of time comprising an electric meter, time actuated recording means, and means coöperating with said meter for producing by said recording means two similar records whose coördinates are the amount of energy consumed and time, the coördinates with respect to the amount of energy consumed of corresponding points on said two records being the same while the coördinates with respect to time of corresponding points on said two records are displaced an amount determined by said predetermined period of time.

10. A demand apparatus for determining the demand of an electrical installation during a predetermined period of time comprising an electric meter, time actuated recording means, and means including said electric meter and said recording means for producing two graphic records of the amount of energy consumed with respect to time, corresponding points with respect to time of said two records being displaced in the direction of the coördinate of time an amount corresponding to said predetermined period of time.

11. The method of determining the demand of an electrical installation during a predetermined period of time which consists in producing two similar records whose coördinates are the amount of energy consumed and time, arranging said records so that the coördinates with respect to the amount of energy consumed of corresponding points on said two records are the same while the coördinates with respect to time of corresponding points on said two records are displaced an amount depending on said predetermined period of time, and determining the demand during the predetermined period of time by comparing the coordinates with respect to the amount of energy consumption of two points on said records having the same coördinate of time.

12. The method of determining the demand of an electrical installation during a predetermined period of time beginning at any desired time which consists in producing two similar records of the amount of energy consumed with respect to time, and arranging said records so that the coördinate of any point on one record with respect to the amount of energy consumed is the same as the similar coördinate of the corresponding point on the other record and so that the coördinate of any point on the first record with respect to time is displaced an amount depending on the predetermined time interval of demand measurement from the similar coördinate of the corresponding point on the second record, whereby the difference between the coördinates with respect to the amount of energy consumed of two points on said records having a common coordinate of time is a measure of the demand during the predetermined period of time beginning at the time represented by the common coördinate of time.

13. The method of determining the demand of an electrical installation which consists in producing two similar records whose coördinates are the amount of energy consumed and time, arranging said records so that corresponding points on the two records have a common coördinate with respect to the amount of energy consumed and different coördinates with respect to time, the difference in said last mentioned coördinates depending upon the period of time during which it is desired to know the demand, and determining the demand by obtaining the difference between the coördinates with respect to the amount of energy consumed of two points on said records having a common coördinate of time.

In witness whereof, I have hereunto set my hand this 1st day of September, 1916.

JAMES R. CRAIGHEAD.